United States Patent
Masud et al.

(10) Patent No.: US 6,785,700 B2
(45) Date of Patent: Aug. 31, 2004

(54) IMPLEMENTATION OF WAVELET FUNCTIONS IN HARDWARE

(75) Inventors: Shahid Masud, Northern Ireland (GB); John Vincent McCanny, Northern Ireland (GB)

(73) Assignee: Amphion Semiconductor Limited, Northern Ireland (GB)

( * ) Notice: Subject to any disclaimer, the term of this patent is extended or adjusted under 35 U.S.C. 154(b) by 485 days.

(21) Appl. No.: 09/736,891

(22) Filed: Dec. 13, 2000

(65) Prior Publication Data

US 2002/0107899 A1 Aug. 8, 2002

(51) Int. Cl.⁷ .............................................. G06F 17/14
(52) U.S. Cl. .................................. 708/400; 382/248
(58) Field of Search .......................... 708/400; 382/248

(56) References Cited

U.S. PATENT DOCUMENTS

| | | | | |
|---|---|---|---|---|
| 5,453,945 A | * | 9/1995 | Tucker et al. | 708/400 |
| 5,706,220 A | * | 1/1998 | Vafai et al. | 708/308 |
| 5,875,122 A | * | 2/1999 | Acharya | 708/407 |
| 6,182,102 B1 | * | 1/2001 | Ramachandran et al. | 708/313 |
| 6,278,753 B1 | * | 8/2001 | Suarez et al. | 375/350 |

* cited by examiner

Primary Examiner—David H. Malzahn
(74) Attorney, Agent, or Firm—Curtis L. Harrington

(57) ABSTRACT

An architecture component for use in performing a wavelet transform of a sampled signal, and an architecture including such components are disclosed. The architecture component includes a multiplier, and a multiplexor to multiplex a number n of filter coefficients onto the multiplier. The multiplier processes n consecutive samples with consecutive coefficients, successive multiplier outputs being stored for subsequent processing to generate an output of the filter after every n samples. The wavelet transform may be a discrete wavelet transform or a wavelet packet decomposition. The architecture component may be configured to multiplex two or more coefficients onto a multiplier. Embodiments are disclosed in which the components are derived from a parameterized description in a hardware description language.

12 Claims, 10 Drawing Sheets

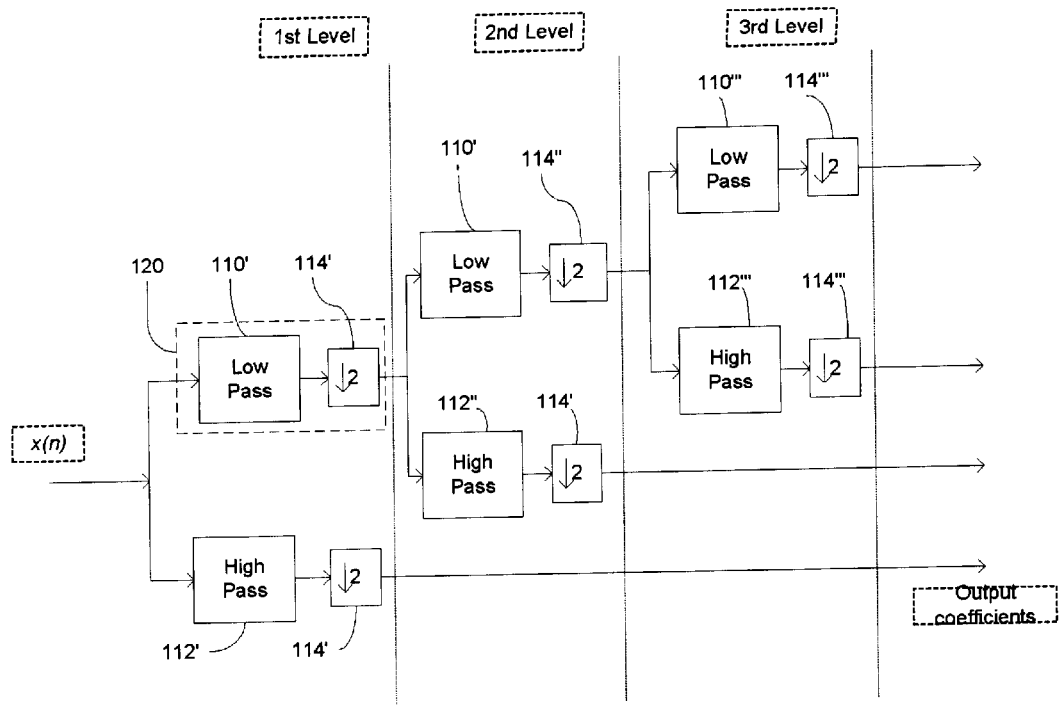
Fig 1 - Prior Art
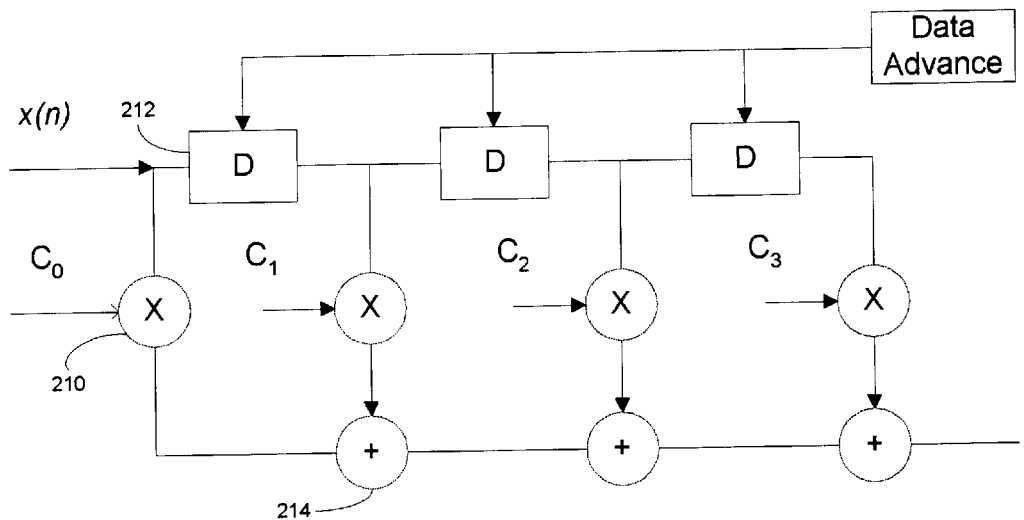
Fig 2 - Prior Art

Fig 12 - Prior Art

IMPLEMENTATION OF WAVELET FUNCTIONS IN HARDWARE

BACKGROUND TO THE INVENTION

1. Field of the Invention

This invention relates to implementation of wavelet analysis in hardware.

Wavelet analysis provides a powerful method for analysing time-varying signals. Conceptually, wavelet analysis can be considered as being related to Fourier analysis. As is well-known, Fourier analysis can transform a signal varying in amplitude in the time domain into a signal that varies in the frequency domain. Fourier analysis thereby provides an indication of the frequency content of the signal. Commonly, Fourier analysis uses sine and cosine as basis functions, whereby the transform is indicative of the sine and cosine content of the original signal across a frequency range.

An important limitation of a Fourier transform is that it is applied across the entire time extent of the original signal: all time information is lost in the transformed signal. This means that any variation in the character of the original signal with time cannot be deduced from the transform. Moreover, a Fourier transform cannot be used to analyse discrete time segments in a continuous signal. For example, if the signal is a continuous speech signal, a Fourier transform cannot be used to perform a frequency analysis on a time-limited segment such as a single word within the speech signal.

Wavelet analysis has been evolved as a more powerful analysis tool. Two features of wavelet functions contribute in particular to their power.

First, wavelet analysis can be performed over a part of the original signal that is limited in time. Moreover, the time over which the analysis operates can be varied simply by making relatively small changes to the analysis procedure. This allows the analysis to be tuned to give results that are more accurate in either their resolution in frequency or in time, as best suits the objective of the analysis (although, it should be noted, that an increase in accuracy in one domain will inevitably result in a decrease in accuracy in the other).

Second, wavelet analysis can be based on an arbitrary basis function (referred to as a "mother wavelet". It might be used to express the frequency content of a time-varying signal in terms of its frequency-domain content of, for example, sine and cosine waves, square waves, triangular waves, or any other arbitrary wave shape. The basis functions can be chosen to give the most useful result based upon the content and nature of the original function and upon the result that is being sought in performing the analysis.

More formally, it can be said that a continuous wavelet transform (CWT) analyses a signal x(t) in terms of shifts and translates of the mother wavelet. This is represented as follows:

$$CTWT(b, a) = \frac{1}{\sqrt{a}} \int h * \left( \frac{t-b}{a} \right) x(t) dt \quad (1)$$

The wavelet transform performs a decomposition of the signal x(t) into a weighted set of basis functions h(t), which are typically time-limited, finite energy signals that oscillate like waves (hence the term "wavelets").

As will be appreciated, this transform is complex, and consumes a considerable amount of computer power if it is to be performed by a computer executing a software program.

This may be acceptable if it is to be used where real time processing is of lesser importance. For example, wavelet transforms are used in software compression or decompression of files representing still images. However, where speed in performing the analysis is critical, this can cause the method to become, for practical purposes, unworkable. For example, if the analysis is to be applied to compression or decompression of moving images in real time, the cost of providing sufficiently powerful computers may be prohibitive. It has therefore been recognised that there may be significant advantage in implementing the transform directly in hardware, for example, for incorporation into an ASIC or FPGA design, or as a core for inclusion in a signal processing hardware system.

As a first step to this end, it has been shown that a discrete representation of the wavelet function allows the transform to be calculated by a small number of relatively simple components, namely, a high-pass filter and a low-pass filter, each filter being followed by a downsampler (otherwise known as a decimator) with a factor of 2. As will be recognised, each of these components can be implemented in hardware in a reasonably straightforward manner. Mathematically, a discrete wavelet transform (DWT) of the discrete function x(n) is represented in Equation 2, below:

$$DWT_{x(n)} = \begin{cases} c_{j,k} = \sum x[n] h_j^*[n - 2^j k] \\ s_{j,k} = \sum x[n] g_j^*[n - 2^j k] \end{cases} \quad (2)$$

The coefficients $c_{j,k}$ describe the detailed components in the signal and the coefficients $s_{j,k}$ refer to the approximation components in the signal. The transfer functions h(n) and g(n) in this equation represent the coefficients of the high-pass and the low-pass filters and are derived from the wavelet function and the inverse (scaling) function respectively. The low-pass filtered and downsampled output of each stage is fed forward to the following stage, which gives a successively reduced time resolution and increased frequency resolution after each stage. Several stages can therefore be cascaded to provide transform outputs at several levels of resolution.

Wavelet packet decomposition is an important development of wavelet analysis. The principle behind these decompositions is to selectively choose the basis function (mother wavelet) and the frequency bands to be decomposed. This basic structure of hardware for performing wavelet packet decomposition is sown in FIG. 12. Improved results in the area of speech and image coding, as well as signal detection and identification, have been reported using this kind of wavelet analysis. There are two issues related to the implementation of wavelet packet transforms. The first is the choice of a different wavelet function for each filter bank and the second relates to the arbitrary connection between the outputs of a filter bank stage to the inputs of the succeeding stages. As will be seen, the characteristic arrangement of a filter followed by a downsampler is clearly present in this circuit as illustrated at 1210.

2. Summary of the Prior Art

A hardware implementation of a DWT is most typically based upon the filter bank arrangement defined in Equation 2. A typical hardware implementation of such a three-level DWT is shown schematically in FIG. 1. 110', 110" and 110''' represent, respectively, a low-pass filter of the first, second and third stages, 112', 112" and 112''' represent, respectively, a high-pass filter of the first, second and third stages, and 114', 114" and 114''' represent, respectively, downsamplers of the first, second and third stages. Each of the filters 110, 112 of the circuit shown in FIG. 1 has a general form shown in FIG. 2, comprising, in each of a plurality of stages, a multiplier 210, a delay line 212 and an adder 214. The characteristics of such a filter (which has a structure very familiar to those skilled in the technical field) is determined by a set of coefficients C1 ... Cn applied respectively to each of the multipliers. Variation of the values of these coefficients, therefore allows the designer to control the characteristics of the wavelet transform operation.

This circuit is typically quite demanding in terms of circuit area requirement. The decreasing sampling rate (a result of the downsampling operations) and increasing word length (a result of the filtering operations) as the stages progress, add to the complexity of the circuit design. In particular, each multiplier 210 represents a considerable demand upon resources.

It has previously been proposed that the design of such hardware might be optimised through production of custom designs which typically use various data organisation formats such as bit-serial and digit-serial designs. However, in most cases, these designs are limited in scope and applicability; typically a new design must be produced for each application. Moreover, these previous proposals have implemented only a limited range of basis functions with limited levels of decomposition. This is particularly disadvantageous because it denies the flexibility and the wide range of transform possibilities that the mathematical analysis suggests should be available using wavelet techniques. Moreover, many previous proposals have proven to be difficult to use in practice, and offer versatility at the sacrifice of efficient use of silicon area and of power.

SUMMARY OF THE INVENTION

An aim of this invention is to provide a design method for implementing hardware capable of performing DWT operations. In particular, its aim is to provide such a method that is versatile and easy to use, and that produces a hardware design that is efficient in its use of components and in the area of silicon that it occupies.

Furthermore, it is desired that the invention provide an implementation for wavelet transforms in hardware that possesses advantageous architectural arrangements as well as flexibility in wavelet choice, levels of decomposition and the word lengths.

In arriving at this invention, the inventors have realised that the downsampling that occurs at each stage means that, in conventional designs, the circuits typically operate at less that maximum capacity. At the first stage, each alternate output from the filters is discarded. Moreover, the input bandwidth at subsequent stage is successively halved, giving rise to additional excess capacity in typical systems in which each stage operates at an identical clock frequency.

More specifically, the filter output $y_{lp}(n)$ from a conventional low-pass analysis filter can be written as:

$$y_{lp}(n) = \sum_{k=0}^{7} h_{lp}(k) x(n-k) \quad (3)$$

Since the output of each wavelet filter is downsampled by a factor of two, the alternate odd and even index values produced from the filter are discarded.

The bi-phase decomposition of wavelet filters can be obtained by observing the output sequence. This allows the impulse response $h_{lp}(n)$ to be written in the form of even and odd order coefficients. The polyphase decomposition of the above filter H(z) can be mathematically described as:

$$H(z) = \sum_{n=0}^{n=7} h(2n) z^{-2n} + z^{-1} \sum_{n=0}^{n=7} h(2n+1) z^{-2n} \quad (4)$$

From a first aspect, the invention provides an architecture component for use in performing a wavelet transform of a sampled signal, the component including a multiplier, and a multiplexor to multiplex a number n of filter coefficients onto the multiplier, in which the multiplier processes n consecutive samples with consecutive coefficients, successive multiplier outputs being stored for subsequent processing to generate an output of the filter after every n samples.

It will be recognised that such a component can serve the same purpose as a filter and a downsampler (for example, as shown at 120 in FIG. 1), this being achieved with a significantly smaller number of components than is possible with a conventional configuration.

Architectures embodying the invention process data at the same rate as a full-length direct-form filter but each multiplier uses a different coefficient multiplier value '$a_n$' (the coefficients) and multiplicand value 'x(n)' (even or odd sample) in each processing cycle. Each filter generates output only when both the even and odd index samples have been processed.

Wavelet transforms to which the invention may be applied include discrete wavelet transforms and wavelet packet decomposition.

In typical embodiments, the result from the odd index samples is temporarily stored in a memory and it is added to the result from even index samples to generate a complete filtered and decimated output.

Thus by using time-interleaved coefficients for the multipliers and an accumulator in the output, up to a 50% reduction in the number of multipliers over a direct-form FIR filter structure is achieved.

In a conventional system used to carry out a wavelet transform, half of the data processed by the filter is abandoned in the downsampling stage. This present invention takes advantage of the filter bandwidth that is effectively wasted in conventional systems.

In a first group of embodiments, an architecture component embodying the invention comprises a plurality of multipliers and associated multiplexors. In such embodiments, the subsequent processing may include generating an output by summing sequential multiplier n samples.

To produce a configuration with a folding number of 1, the value of n may be equal to 2.

An architecture component embodying the invention may have a number m of processing stages, each stage including a multiplier. In such embodiments, sample data may be conveyed from each processing stage to a subsequent processing stage with a delay of n times a sampling period of the signal. For example, such embodiments may include a chain of n buffers through which data is conveyed from each stage to a subsequent stage.

Embodiments of the invention may further include a buffering stage in which an output value from each processing stage can be stored. A summing stage may be provided that is operative to sum the values stored in the buffering stage to produce an output for every n samples received.

In order to achieve a greater degree of folding, an architecture component embodying the invention may further comprise a multiplexor operative to present each sample to a multiplier a plurality of times for multiplication by a plurality of coefficients.

Embodiments of the invention may be configured to operate as a filter of order m.n followed by a downsampler of order n. (For example, it may act as a Daubechies 8-tap filter followed by a downsampling of 2 in which case m=4 and n=2.)

In embodiments according to the last-preceding paragraph, the filter operation performed by the architecture component may be a low-pass filter or a high-pass filter operation.

The (or each) multiplier in embodiments of the invention may be constituted by separate multiplier units or may be embodied within a MAC unit.

Architecture components embodying the first aspect of the invention are most typically incorporated into an architecture for performing a discrete wavelet transform of a sampled signal. The invention provides such an architecture from a second of its aspects. For example, such an architecture may comprise an architecture component configured to operate as a low-pass filter followed by a downsampling connected in parallel with an architecture component configured to operate as a high-pass filter followed by a downsampling. Such an architecture may also comprise a plurality of series-connected architecture components of the invention's first aspect.

From a third aspect, the invention provides a core for incorporation into an integrated circuit for implementing a wavelet transform, the core having an architecture according to any preceding claim. Such a core can be used as a "plug in" component in the construction of a wide range of complete electronic systems.

From a fourth aspect, the invention provides an architecture component for use in performing a wavelet transform, the architecture implementing the function of an n-tap filter followed by a downsampler, the architecture including a number of multipliers less than n, and a multiplexor for applying to the multiplier a plurality of multiplier coefficients, whereby successive data samples are processed by the multiplier using alternative filter coefficients multiplexed onto the multiplier.

For a folding factor of 1, embodiments of this aspect of the invention may have n/2 multipliers.

Most typically, each multiplier acts upon sequential data samples with alternative filter coefficients. Where n=2, two filter coefficients for each multiplier may be applied to the multiplier alternately.

In processing the signal, such an architecture component may be configured to multiply each sample by a total of n/2 coefficients. These multiplications may be carried out by a single multiplier (spaced in time, typically by an integer multiple of the sample period), or may be carried out by a plurality of multipliers, or both.

The time-interleaved approach is not only attractive in terms of hardware implementation of wavelet transforms, but also readily lends itself to parameterisation and is thus suitable for rapid design and synthesis. Attention here is focused mainly on high throughput applications and consequently a bit-parallel, word-serial filter implementation has been assumed. However the basic architecture can be simply extended to create silicon generators in which other word formats, such as bit-serial or digit-serial data streams are used. This allows flexibility across applications in trading silicon area with performance specifications.

Therefore, from a fifth aspect, the invention provides a method for defining an architecture for performing a discrete wavelet transform of a sampled signal in which the wavelet transform is defined in terms of a plurality of numeric parameters. These parameters may specify one of more of the following: the choice of wavelet function; the input word length; the output word length; the rounding or truncation required; additional bits to prevent adder over-flow; and the amount of folding within the architecture.

A method of this aspect if the invention may define the architecture in a hardware definition language such as VHDL, Verilog etc., a netlist format such as edif, xnf, etc., an ASIC or FPGA layout or a combination of any of the above, amongst others.

Through the use of systematic folding and multiplexing, efficient silicon hardware for a variety of throughput specifications can be produced by embodiments of this invention. In most practical applications, the required throughput is orders of magnitude lower than the processing speed obtainable from these cores. An increase in silicon efficiency is therefore possible by the re-use of hardware resources at multiplier-accumulator level. The architecture described in this section is based on a systematic folding and retiming methodology which multiplexes low level operations (multiplication, addition, accumulation etc.) on to a reduced number of components. The amount of folding depends on the wavelet choice and the downsampling ratio. The folding factor is specified as a generic parameter along with the required wavelet type. Based on this information, an efficient folded architecture for a multi-level discrete wavelet transform is generated.

From another aspect, the invention provides a method for defining an architecture component for performing a wavelet transform, the definition including generating a list of generic parameters and ports for the component, connecting the delay line to the multipliers and appropriate coefficients to the multiplier through a multiplexor.

Such a method may further comprise one or more of the following steps: connecting an adder to the output of the multiplier; generating delay line taps; generating MAC units required; generating an adder and buffer memory and a latch; or generating interconnections within the architecture.

Embodiments of the invention will now be described in detail, by way of example only, and with reference to the accompanying drawings.

BRIEF DESCRIPTION OF THE DRAWINGS

FIG. 1 is a block diagram of a typical hardware implementation of a three-level discrete wavelet transform, and has already been discussed;

FIG. 2 is a block diagram of a filter being a component of the implementation of FIG. 1;

DETAILED DESCRIPTION OF THE PREFERRED EMBODIMENTS

In embodiments of the invention, each of the filters and downsamplers shown in FIG. 1 (or FIG. 12) at 120 is replaced with a combined filter and downsampler architecture component employing a so-called "folded architecture". Construction of a Folded Architecture Filter and Downsampler This embodiment implements a wavelet filter that implements an 8-tap low-pass wavelet analysis filter of the class known as 'Daubechies 4'.

As is well-known, a single stage of wavelet decomposition consists of a low-pass filter and a high-pass filter. Both are followed by a decimation stage. The filter output $y_{lp}(n)$ from the low-pass analysis filter can be written as:

$$y_{lp}(n) = \sum_{k=0}^{7} h_{lp}(k)x(n-k) \quad (3)$$

Since the output of each wavelet filter is downsampled by a factor of two, this means that the alternate values produced from the filter are discarded.

A bi-phase decomposition of wavelet filters can be obtained by observing the output sequence, and considering the effect of discarding results on the output of the filter as a whole. This allows the impulse response $h_{lp}(n)$ to be written in the form of even and odd order coefficients. The bi-phase decomposition of the above filter $H(z)$ can be mathematically described as:

$$H(z) = \sum_{n=0}^{n=7} h(2n)z^{-2n} + z^{-1}\sum_{n=0}^{n=7} h(2n+1)z^{-2n} \quad (4)$$

In this embodiment, the data is processed at the same rate as a full-length direct-form filter. However, each multiplier uses a different coefficient multiplier value '$a_n$' associated with h(n) (the coefficients) and multiplicand value 'x(n)' for even and odd samples in each processing cycle. In effect, two different values of $a_n$ and x(n) are multiplexed onto each multiplier for odd and even samples respectively, and the result is only output when both the even and odd index samples have been processed.

The result from the odd index samples is temporarily stored in a memory and it is added to the result from even index samples to generate a complete filtered and decimated output. Thus, by using time-interleaved coefficients for the multipliers and an accumulator in the output, an approximate 50% reduction in the number of multipliers over a direct-form finite impulse response (FIR) filter structure is achieved. This interleaving of filter coefficients is illustrated in FIG. 3.

Figure 3:
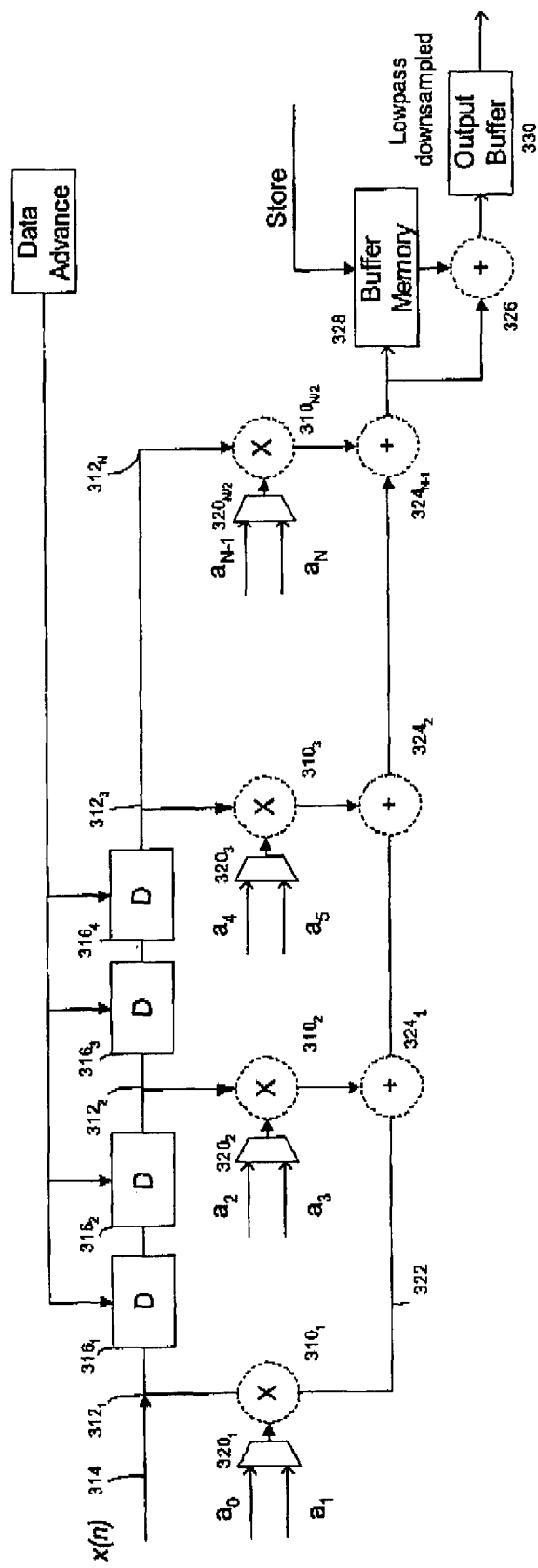
FIG. 3 illustrates an implementation of a time-interleaved N-tap wavelet filter being a component of an architecture embodiment of the invention for performing a discrete wavelet transform.

With reference first to FIG. 3, there is shown an N-tap wavelet filter that carries out a low-pass filtering and downsampling operation.

The filter comprises N/2 stages, each of which includes a multiplier $310_1$–$310_n$. Each multiplier has its a multiplicand input connected to a respective connection point $312_1$–$312_{N/2}$ on a data input line 314. Between successive connection points 312, there are two data delay buffers $316_1$–$316_{N-2}$, all such buffers being controlled by a common data advance clock line 318 that operates in time with arrival of the data samples.

The multiplicand input of each of the multipliers receives data from an output of a respective multiplexor $320_1$–$320_{N/2}$. Each multiplexor 320 has two inputs, either one of which is connected to the output. Filter coefficients are applied to the outputs, coefficients $a_1$ and $a_2$ being applied to the first multiplexor $320_1$, up to coefficients $a_{N-1}$ and $a_N$ being applied to the N/2th multiplexor $320_{N/2}$. Each multiplexor is configured to exchange which one of its inputs is connected to its output at each cycle of the clock line.

The output of each multiplier is fed to a data output line 322, with successive outputs being added by adders $324_1$–$324_{N-1}$. The output data line 322 supplies data that includes the sum of all stages of the filter to a first input of an adder 326 and a data buffer 328, the buffer being configured to store data at each alternate clock cycle. The buffer 328 output is connected to a second input of the adder 326.

The output value of the filter is derived from the output value of the adder 326. This value is stored in an output buffer 330, the output value being updated every two clock cycles.

The operation of this time-interleaved circuit can be explained as follows. The first sample arrives on the data input line 314 at time $t_0$ to find the first coefficient set $a_0$, $a_2$, $a_4$, ... $a_{n-1}$ respectively available at each of the multipliers 310. The output value $a_0x(0)$ is calculated by the first multiplier 3101 and passed to the data output line 322 to provide the first output. The second (odd) sample arrives at time $t_1$ to encounter the coefficient values $a_1$, $a_3$, $a_5$ ... $a_n$. Meanwhile, the previous input x(0) moves forward through one delay 316 and hence it is not operated by any multiplier. The output value a1x(1) is calculated and this is stored in the buffer 328. When x(2) sample arrives, x(0) has advanced to the next multiplier $310_2$. The output value $a_0x(2)+a_2x(0)$ is therefore produced and added to the value $a_1x(1)$ which was calculated in the previous odd cycle. This represents the second downsampled output value. The process continues to give a downsampled and filtered output. Thus, the same multipliers and adders are used to process two consecutive data samples.

Figure 13:
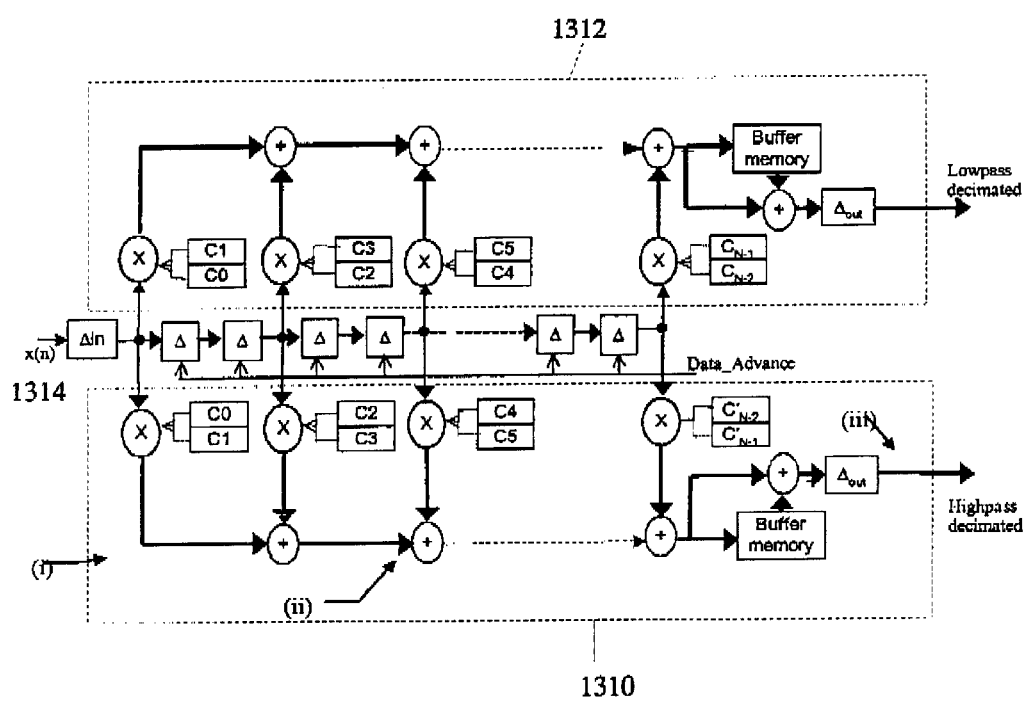
FIG. 13 is a diagram of an implementation of an architecture for use in wavelet transform or wavelet packet transform.

It will be noted that this arrangement can further optimise the use of hardware by sharing the same delay line between the two filters in the filter bank, shown in FIG. 13.

As an example, suppose that the un-folded wavelet filter architecture shown in FIG. 3 operates at a data throughput rate of T MHz. This filter is based on the use of a word-parallel data format that provides a high throughput where T=100 MHz in a 0.35 m CMOS technology. Now consider a case in which the maximum input-data arrival rate is only 50 MHz (i.e. T/2). This situation may, for example, be encountered in multi-rate filter banks. In this example application, the hardware is operating at only 50% of its capacity.

Figure 4:
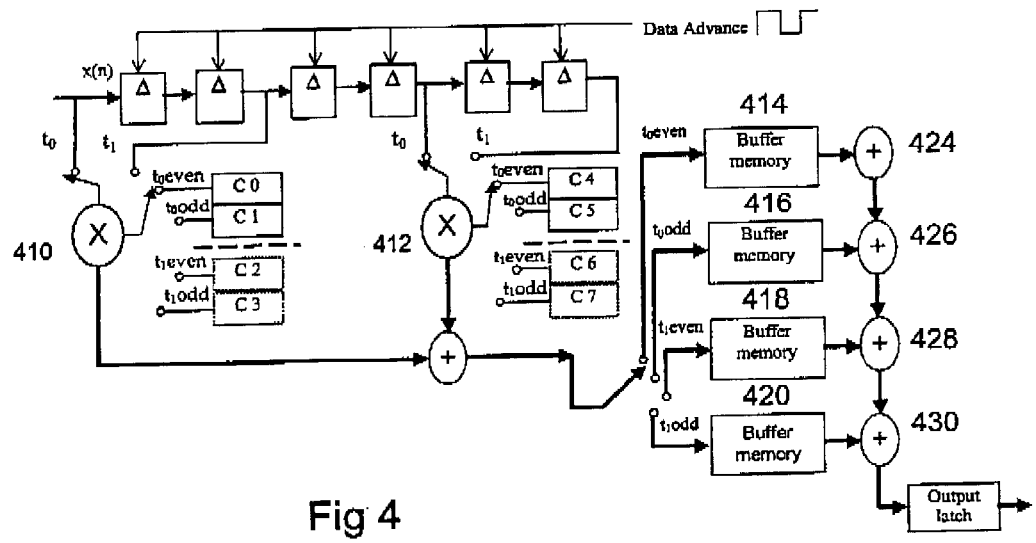
FIG. 4 shows an alternative implementation of a time-interleaved N-tap wavelet filter being a component of an embodiment of the invention.

An optimisation of the filter circuit of FIG. 3 for these operating conditions is shown in FIG. 4. In this case, a saving in hardware can be achieved by multiplexing the operation of four multiplication operations on two multipliers 410, 412. The individual components in the filter (i.e. the multiplier, adder etc.) are clocked at a rate corresponding to T, but the data throughput at the filter ports corresponds to a rate of T/2. The partial products from each of the multipliers 410, 412 are individually stored in latches 414 . . . 420 and added by adders 424 . . . 430 to produce a final filter output at an output latch 430. It should also be noted that, in this embodiment, both inputs to each multiplier 410, 412 are multiplexed. The multiplier input is multiplexed to receive an input from an input side of a delay line and an output side of a delay line. Thus, the same samples are presented to the input of each multiplier two times, spaced in time by twice the sampling period. However, on the two occasions that the sample is presented to the multiplier, it is multiplied by a different multiplier coefficient.

Figure 5:
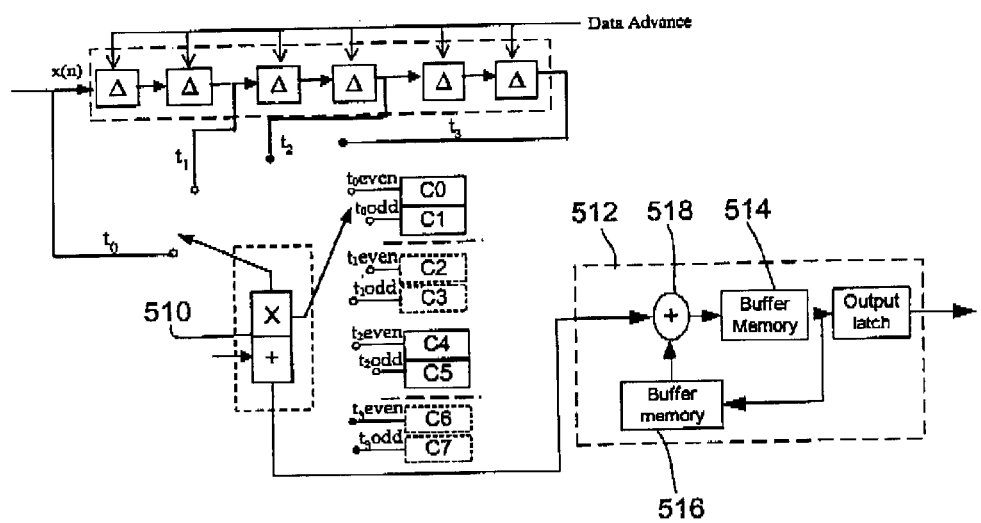
FIG. 5 is a further implementation of a time-interleaved N-tap wavelet filter being a component of an embodiment of the invention.

Similarly, for a desired throughput of T/4, the multiplexing can be extended to fold the operations of four multiplications and additions on to one accumulator. The resulting arrangement is shown in FIG. 5. This architecture employs a MAC unit 510 to facilitate the operation over a variable range of folding requirements. An output block 512 in FIG. 5 comprises two latches (buffers) 514, 516, in forward and feedback paths respectively, and a pipelined adder 518 that holds the calculation for odd order and adds it with the output of even order to produce the final result. This arrangement is designed to facilitate control and synchronisation over multiple folding factors. It has been found that hardware sharing in this wavelet filter architecture embodying the invention may lead to a trade-off between speed, area and power requirements while retaining the architectural attributes within the scope of this invention.

1. The choice of wavelet function,
2. The coefficient word length,
3. The data word length,
4. The rounding or truncation required,
5. Additional bits to prevent adder over-flow,
6. A parameter corresponding to the amount of folding.

The folded architecture of this embodiment uses an interconnection algorithm to connect a delay line with an appropriate multiplier-accumulator (MAC) unit and with output blocks.

A pipelined Wallace tree MAC unit was employed from a predefined synthesisable library. A coefficient allocation method allows a designer to select a wavelet function and appropriate wordlengths at the time of instantiation through generic specifications only.

Figure 6A:
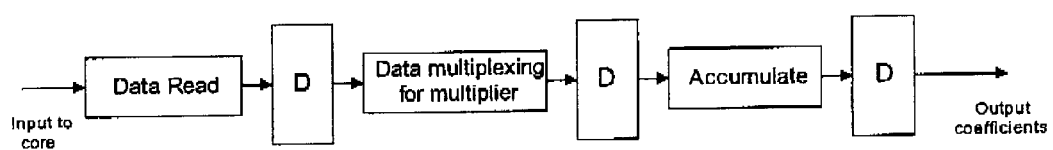
FIG. 6a is a diagram of pipelining in the filter of FIG. 5.
Figure 6B:
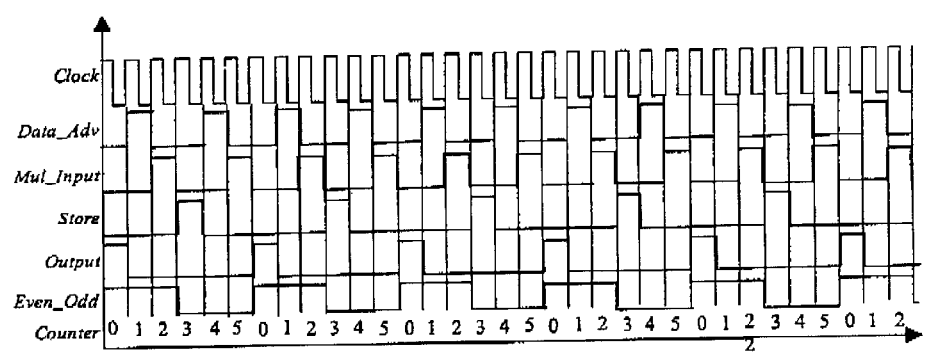
FIG. 6b is a timing diagram of the filter of FIG. 5.

The control circuit in this architecture is based on pipelining at three stages, as shown in FIG. 6a. The timing sequence corresponding to a folding factor of one is illustrated in FIG. 6b.

The timing signals are under the control of the Counter signal that counts from 0 to (6F−1), where F is the amount of folding. A new data value is input every (3F−1) clock cycles and an output is produced at every (6F−1) clock cycles. The signal Store is used to control accumulation and the signal. The signal Output prompts the completion of a processing cycle. The Even_Odd signal, in combination with the Counter signal, is used to control the connection of appropriate coefficients to the multiplier.

The following table represents the performance figures for different single stage wavelet transform cores produced using the invention.

TABLE 1

| Wavelet type | Data wordlength | Coefficient wordlength | Folding specified | Silicon area | Number of gates |
| --- | --- | --- | --- | --- | --- |
| Daubechies 4-tap | 9 bits | 9 bits | 1 (No Folding) | 0.515 mm$^2$ | 7.74 K |
| Daubechies 4-tap | 9 bits | 9 bits | 2 | 0.309 mm$^2$ | 4.57 K |
| Daubechies 8-tap | 9 bits | 9 bits | 4 | 0.671 mm$^2$ | 8.55 K |

Parameterisation of Folded Architectures

It is highly desirable that circuit designers should be able to re-use development work without having to re-design items that have once been developed. To this end, embodiments of the invention further provide a parameterized generator for wavelet transform architectures, based upon the architectures illustrated in FIGS. 4 and 5. Such a generator allows a designer to produce wavelet transform architectures to perform as required simply by selecting an appropriate parameter set.

The set of parameters defined in this embodiment include the following:

A Three-level DWT Processor

Figure 7:
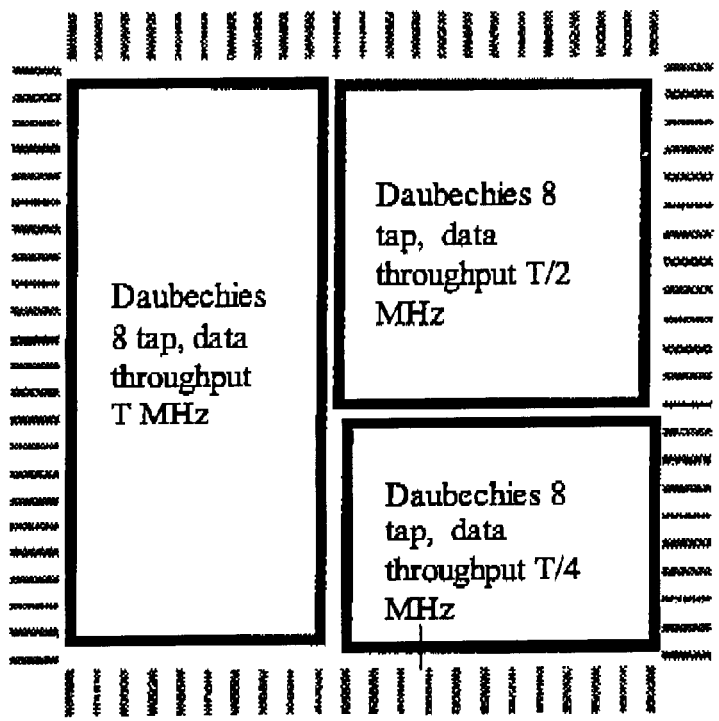
FIG. 7 is an initial floor plan using a hierarchical placement for a silicon chip embodying the invention.

A further embodiment of the invention resides in a silicon chip capable of performing three-level discrete wavelet transform using a Daubechies 8-tap wavelet function. This is based on the use of folded DWT cores having an architecture as described above. The wordlength allocation and other resulting measures are given in Table 2, below. The total number of gates required in this case is around 36K. The power consumption of this embodiment at 100 MHz clock rate is around 650 mW in 0.35$\mu$ technology. The initial floor plan of this embodiment, using a hierarchical placement, is shown in FIG. 7.

TABLE 2

Specifications of three-level folded wavelet cores

| Level | Throughput | Wavelet type | Data wordlength | Coefficient wordlength | Number of gates | Silicon area |
| --- | --- | --- | --- | --- | --- | --- |
| 1 | T | Daubechies 8 tap | 9 bits | 8 bits | 14.04 K | 1.21 mm$^2$ |
| 2 | T/2 | Daubechies 8 tap | 13 bits | 8 bits | 11.61 K | 1.02 mm$^2$ |
| 3 | T/4 | Daubechies 8 tap | 17 bits | 8 bits | 9.82 K | 0.73 mm$^2$ |

In an ideal case, a folded wavelet core instantiated with a folding factor of F/2 would be exactly half the size of a similar core instantiated with a folding factor F. The silicon area utilisation in Table 2 shows that the actual area required at T/2 throughput is about 85% of that of an unfolded first stage. The reduction in area, as well as the number of gates, results in a corresponding decrease in power consumption. Similarly, other wavelet functions can be favourably compared. The scheme developed here allows flexible design trade-offs to be easily applied and analysed through generic parameters. Similarly, the area corresponding to T/4 throughput is 60% of the first stage. There are two reasons for this:

- the wordlength grows as the results pass through various filtering stages,
- hardware sharing due to folding causes an area overhead which becomes more pronounced at higher octave levels.

This latter issue will be discussed further in the FPGA implementations described below.

Area Overhead Due To Folding

Figure 8:
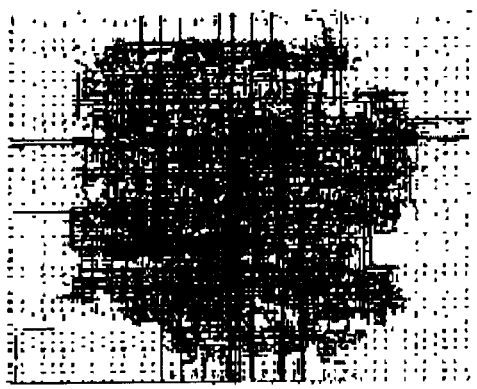
FIG. 8 shows an implementation of a Daubechies 4 (8-taps) filter with no folding.
Figure 9:
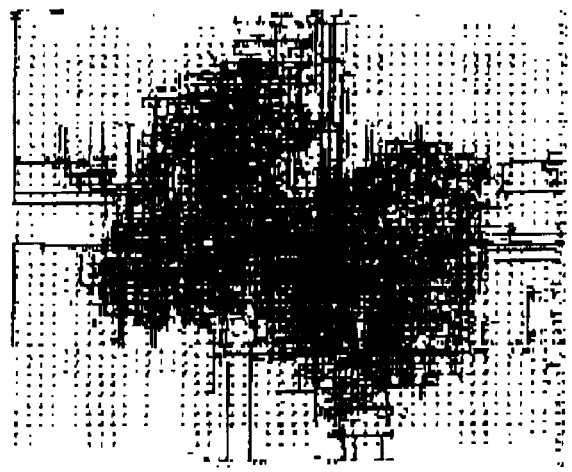
FIG. 9 shows an implementation of a Daubechies 4 (8-taps) filter with a folding factor of 2.
Figure 10:
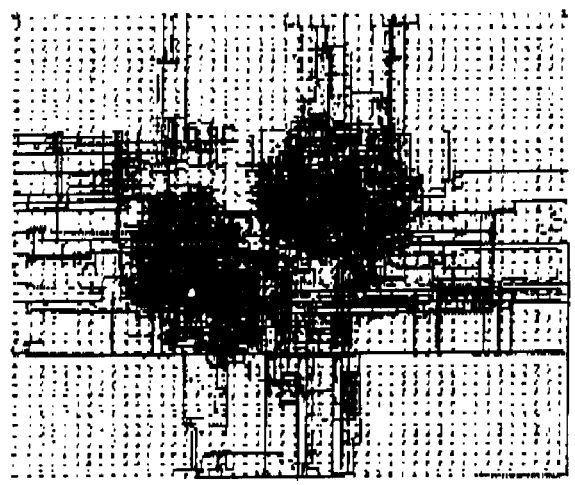
FIG. 10 shows an implementation of a Daubechies 4 (8-taps) filter with a folding factor of 4.
Figure 11:
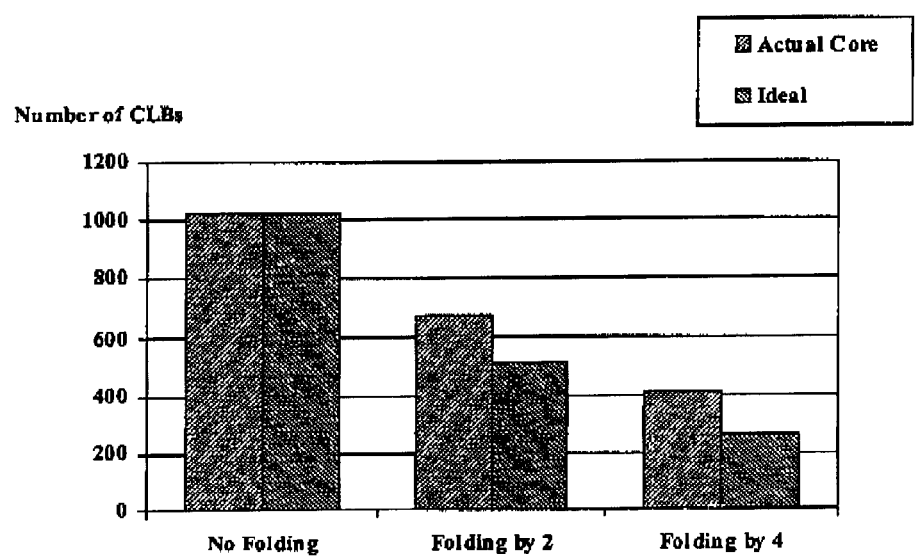
FIG. 11 is a graph of FPGA resource utilisation against folding factor for a wavelet filter.

Single-level embodiments of a Daubechies 8-tap wavelet function using three different folding factors will now be compared. The input data wordlength and the coefficient wordlengths are the same for the three implementations. The results obtained are summarised in Table 3. The corresponding place and route schematics on a Xilinx XC4052XL FPGA part are also shown in FIGS. 8 to 10. These correspond to the downsampling ratios of 2, 4 and 8 respectively (or folding of 1, 2 and 4). A comparison of FPGA utilisation for different folding factors is illustrated in FIG. 11.

It will be seen that this embodiment of the invention has as one of its advantages the flexibility that allows a designer to tailor area, power and speed specifications of the core through a generic parameter only. A number of further parameters allow the designer to tailor speed and area performance in a variety of possible combinations.

The architectures described above can be implemented in, amongst others, ASIC and FPGA technologies. However, it will be readily understood that the principles of the invention can be applied to many alternative technologies, largely independently of the implementation. The results indicate the suitability of the methods for a wide range of specifications from audio to real-time video processing.

One particular class of embodiments implement the invention through the use of parameterized wavelet cores. These offer many significant advantages over known implementations. The first and most important is the possibility to choose the wavelet function at the time of core instantiation. The second is the fact that the design of embedded control for these cores allows them to be cascaded in any fashion to generate an arbitrary time-frequency tiling. The appropriate wordlengths and quantisation for any decomposition tree can also be discreetly specified.

In a filtering process the values stored in delay lines are multiplied by coefficients and added to produce a filtered output. In this kind of multiplication and addition, the word length of the final filtering result is bound to be more than the word length of either the input sample or the coefficient. For a typical case in a wavelet transform, a number of filtering stages are cascaded. As a typical example, starting with 8 bits input data samples, can produce over 24 bits wavelet output after a three level wavelet transform. This

TABLE 3

FPGA utilisation for a single stage folded architecture

| Wavelet function | Data wordlength | Coefficient wordlength | Number of CLBs | Equivalent gate count | Folding level‡ | Number of MACs* |
|---|---|---|---|---|---|---|
| Daubechies 8 tap, 1 level | 9 bits† | 9 bits | 1018 | 13.9 K | 1 (no folding) | 8 |
| Daubechies 8 tap | 9 bits | 9 bits | 672 | 8.58 K | 2 | 4 |
| Daubechies 8 tap | 9 bits | 9 bits | 412 | 5.35 K | 4 | 2 |

†9 bits correspond to 8 bits magnitude + 1 sign bit.
‡A folding of '1' corresponds to the architecture shown in FIG. 3, folding of 2 corresponds to the architecture in FIG. 4 and so forth.
*The number of MACs is that required in producing a full filter bank stage, comprising one low-pass and one high-pass filter.

An analysis of the data presented in Table 3 and the graph in FIG. 11 provides some insight into the overhead incurred in device utilisation due to folding of MAC operations. At a folding level of 4, for example, 412 configurable logic blocks (CLBs) are required by the folded architecture developed, whereas an ideal folded architecture would need only a quarter of the resources i.e. 254 CLBs. Thus there is an overhead of 158 CLBs due to multiplexing. This corresponds to 38% of the 412 CLBs being used.

Similarly the overhead at a folding factor of 2 corresponds to 163 CLBs or 24.2% of the 672 CLBs used. From these observations, a folding factor of 4 appears to be a typical advantageous upper limit for these kind of wavelet transform architectures, although the invention is not limited to such a range of folding factors. Any further increase in folding for example, if the aim were be to provide a digit-serial operation, could result in more FPGA resources being allocated to multiplexing overhead than the actual circuit. Such embodiments may therefore be unpractical.

puts excessive load on silicon area requirements as bigger adder, multiplier and delay elements will be required to process bigger word lengths. Practically, not all of the word's length is important because it can contain leading zeros or the result can be rounded. Desired accuracy requirements from result can be less stringent as well.

This embodiment of the invention has these word lengths assigned as generic parameters for each stage of wavelet filter bank. Thus they can be easily and accurately specified so that the most efficient hardware for desired specs is produced.

The MAC level folded wavelet transform architecture where the folding factor is under the control of a generic parameter is an important feature of preferred embodiments of the invention. The basis of the folded architecture used is an efficient implementation of a generic wavelet filter. This architecture has an embedded accumulator and a control circuit which make it conducive to multi-rate filter bank style implementations.

The invention can further be embodied in many alternative structures that are not actual hardware but, instead, are representative of hardware. For example, it may be embodied in any hardware description language that supports generic parameter specification, can be used to describe the methodology developed. The method can also be used for the design and implementation of any FIR filter for use in digital signal processing.

Application To Wavelet Packet Decomposition

Figure 12:
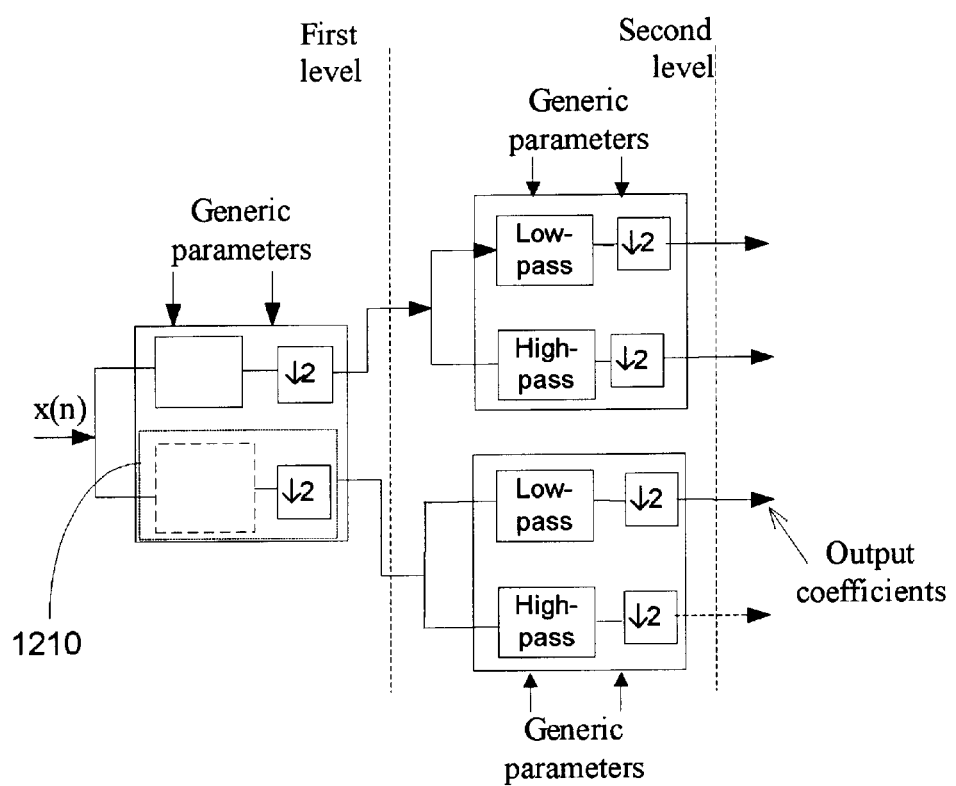
FIG. 12 is a block diagram of a typical hardware implementation of a two-level wavelet packet transform, and has already been discussed.

As will be seen from FIG. 12, hardware implementation of wavelet packet decomposition includes a plurality of filtering and downsampling stages. Clearly, these may be replaced by architecture components embodying the invention to gain the advantages of the invention in wavelet packet decomposition architectures.

An advantageous configuration for such an implementation is shown in FIG. 13. Each of the high-pass and low-pass stages 1310, 1312 are configured in a manner similar to that shown in FIG. 3, discussed above. However, in order to minimise the component used, the delay line 1314 is shared between the two filter elements.

Coefficient Allocation Procedure

The scalable hardware architecture described has could be captured in a hardware definition language such as VHDL. This facilitates the modular design methodology by allowing replication of smaller processing blocks. However, there is no direct mechanism in this language to acquire the wavelet coefficients from a high level description. In addition, the coefficients cannot be supplied at the time of instantiation because only integers are permitted as generic parameters.

The following method was therefore developed to incorporate a range of wavelet families through a generic description.

MATLAB (r.t.m) code is used to generate a text file containing the coefficients for any desired wavelet. The use of a numerical package offers a substantially unlimited range of possibilities regarding the choice and future development of wavelets. The text file containing real-number coefficients is then converted to 2's complement format at 16-bit resolution using VHDL code. The required wordlength specified in the generic description is chosen at the time of instantiation. Each wavelet is identified by a separate index that is specified using generics to access those coefficients. Addition of a new wavelet is simple and involves repeating these steps.

The code in listing 1 demonstrates the implementation of the invention in a practical design of a three-level discrete wavelet transform. The code is written in VHDL hardware description language and follows its syntax. Appropriate signals for connecting the outputs of one stage to the input of the next are defined. The word lengths of these signals are truncated as per requirements. The invention is instantiated as a component with appropriate generic parameters for each stage of wavelet transform. The resulting design produced is shown in FIG. 7.

The code in listing 2 below (single_rate5.vhd) describes the central component of embodiments of the invention. The component has two main parts;

1. Generating the appropriate number of delay line taps, multipliers (MACs), adders and the output accumulator circuit.
2. The second part of the code generates appropriate interconnections between
   a. The elements of delay line
   b. The inputs of the multiplier. These contain connections to the elements of delay line as well as to the coefficients.
   c. Connections to the output accumulator circuit comprising adders and buffer memory.
3. The third part of the code represents the control circuit. This controls the sequencing of appropriate inputs to the multiplier and reading the input as well as providing the output.

The algorithms working behind these operations are shown in the code and also explained in the description of the generic parameters.

Thus the generic description translates into corresponding number of delay line elements and MACs. The width of the inputs and outputs of these elements is also obtained from generic specifications. The coefficients are chosen from the coefficient-look-up table procedure already explained under similar heading.

Parameterisation Scheme

Figure 14:
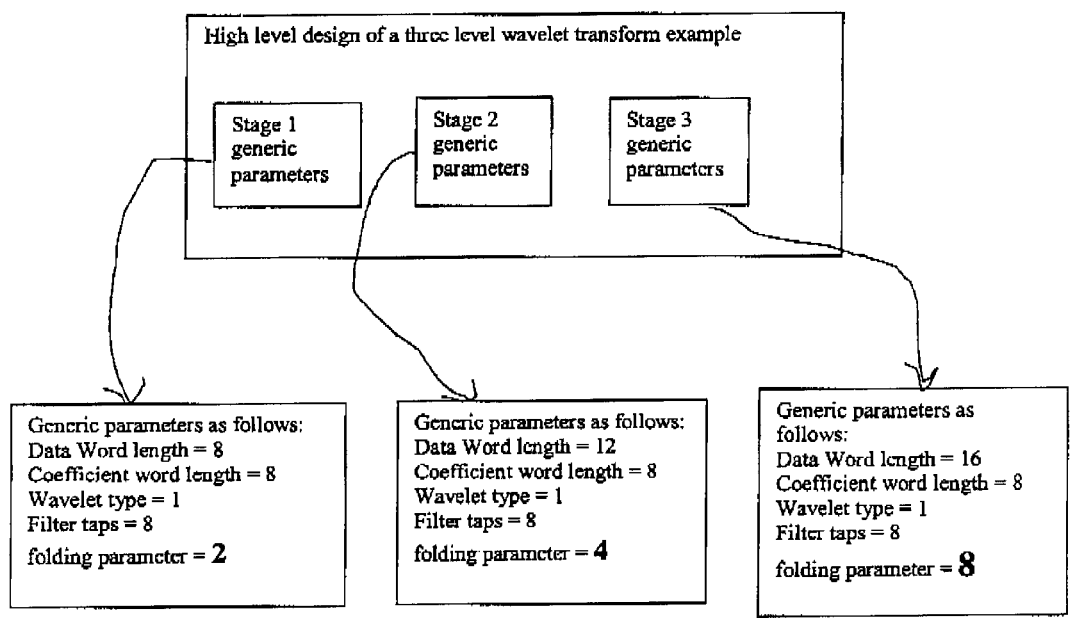
FIG. 14 illustrates the hierarchy of parameters used to describe an architecture embodying the invention.

The hierarchy of parameters used within the parameterisation scheme is shown in FIG. 14.

Table 4 below shows some of the entries in the coefficients package. The location of filter coefficients in the VHDL package is purely arbitrary.

TABLE 4

Entries of wavelet analysis and synthesis filter

| Generic number | Wavelet type |
| --- | --- |
| 1 | Daubechies 8 tap, analysis |
| 2 | Symmlet 12 tap, analysis |
| 3 | Daubechies 4 tap, analysis |
| 4 | Morlet, analysis |
| 5 | Coiflet type 1, analysis |
| 6 | Coiflet type 2, analysis |
| ... | ... |
|  | (Synthesis filters) |
| 1001 | Daubechies 4 tap, synthesis |
| 1002 | Daubechies 8 tap, synthesis |
| 1003 | Coiflet type 1, synthesis |
| 1004 | Coiflet type 2, synthesis |
| 1005 | Morlet, synthesis |
| 1006 | Symmlet, synthesis |
| ... | ... |

Generic parameters are translated as will now be described.

Wavelet type parameters=1

Initially, whenever the coefficients file is created, the filter type is set to a Daubechies 8-tap filter. By means of a memory look-up-table (see Table 4), this parameter is used to find the coefficients and loads them in the design in an array. The elements of this array, as shown in Listing 2, are then connected to the multipliers. In accordance with the principles of this invention, these connections are time-multiplexed, meaning they connect to a reduced number of multipliers (e.g. 8 coefficients folded onto one multiplier) at different times under the control of control signals.

Data Word length=8: This parameter sets the width of the delay line and one input of the multiplier to the value specified, i.e. 8, 12, 16 or whatever.

In Listing 2 the generic parameter D_W:integer range 1 to 32 controls the width of the data bus. So instead of specifying exact number of bits in the code, the parameter D_W is used, where D_W is specified externally in the high-level design.

Coefficient Width=8 (or whatever specified)

Just as the parameter for data word length, this one specifies the width of the other multiplicand input used in the multiplier. In Listing 2 this is shown as parameter C_W.

The parameters C_W and D_W are then used to automatically determine the width of the multiplier or MAC to be employed in the circuit.

Taps parameter=8

Just defines the number of taps in the wavelet filter being used. This parameter is then used to calculate the number of additional overflow bits at various stages.

Taps parameter is importantly used in almost all procedures and functions in the listing to calculate timing, generate multiple components.

Decim parameter=2 (or 4, 8 or whatever)

Along with Taps parameters, it is the most important as it determines the number of components required in the circuit leading to efficient architecture and area utilisation. Also it is used in the control circuit in appropriate time-multiplexing of elements from delay line and filter coefficients.

Number of MACS=Taps/Decim

So for 8 taps and Decim=2, we require 4 MAC units, for Decim=4 we require 2 MAC units and for Decim=8 we can fold the entire circuit on one MAC unit. These Decim values are respectively used for stage1, stage 2 and stage 3 of wavelet transform. Thus variation of one value of a generic parameter can result in substantial saving of the hardware and produce appropriate hardware for that particular stage of wavelet transformation.

The software in Listing 2 demonstrates the use of all these parameters in much more exact way especially from control circuit point of view and connection of appropriate coefficients and delay line elements to the multiplier.

```
e.g. to generate the delay line:
    for i = 1 to number_of_taps loop
        generate delay_line_elements
    end loop
e.g. to generate MACs
    for i=1 to (Taps/Decim) loop
        generate multipliers_accumulators
    end loop
```

The attached listings will now be briefly described. Note that lines beginning '-' are comments.

1. Define the libraries to be used in the project. All the pre-defined components start with Use DSiP . . . ; the high level components (including the library containing pre-defined invention 'single_rate5'), and the coefficients libraries are defined here.
2. The entity description defines the entire design of a three level wavelet transform as a single component. All the input and output ports are defined with appropriate word lengths.
3. The architecture description includes a list of any components that will be used in this design along with the list of signals used to interconnect components and other variables.
4. The Begin statement (at Reference 1) starts the description of the architecture of this three-level wavelet transform design. U1, U2 and U3 are the instance names of three single_rate5 blocks that have been used in the design. The lines generic map(, . . . , . . . , . . . ) indicate the generic parameters that were used to specify wavelet type and word lengths for each stage along with folding parameter.
5. This is followed by a list of signals which interconnect these blocks.

Listing 2: Defines the design of component single_rate5.

1. Define the libraries used.
2. The entity definition now includes the list of generic parameters and ports for the single_rate5 component.
3. The architecture starts by listing all the components that have been used in the design followed by functions, constants, signal and variables used in the design. Then there are two procedures which control the connection of delay line to the multipliers. The function defined earlier controls the connection of appropriate coefficients with the multiplier.
4. The last procedure (Reference 2) control the connection of adder to the output from previous multiplier.
5. The design begins at Begin statement at Reference 3.
6. The delay line taps for both filters are generated.
7. The MAC units required for both filters are generated.
8. The output circuit comprising adder and buffer memory and latch is then produced.
9. Finally, coefficients are assigned and appropriate interconnections are produced.
10. The Process called Control_Block, Reference 4, generates the control signals so that appropriate taps, coefficients are connected to the multipliers and results are appropriately accumulated to produce a correct output. All the algorithms (lines contained within functions and procedures and processes) are part of invention as they describe the method by which the scheme works.

Note: The lines beginning with two dashes—in the code are all comments.

29

LISTING 1

```
-- ------------------------------------------------------------------
-- Name of vhdl code: wave_block23.vhd
-- Purpose: A three level wavelet decomposition using single_rate5 block.
-- Uses Daubechies 8 taps analysis wavelet, 9 bits data, 8 bits coefficient,
-- 8 bits truncation after each stage.
-- Library components used: DSiP, IEEE
-- Comments: Optimized, single rate wavelet architecture
-- Author: Shahid Masud, Ph.D. Student, Q.U.B.
-- Date Started: Mar 05, 1999
-- ------------------------------------------------------------------ library IEEE;
use IEEE.std_logic_1164.all;
use IEEE.std_logic_arith.all;
--
LIBRARY DSiP;
USE DSiP.Basic.ALL;
USE DSiP.MultBase.ALL;
USE DSiP.DFFBase.ALL;
USE DSiP.AddBase.All;
--
LIBRARY WORK;
Use Work.Wavelet_Coeffs.all;
Use Work.Components.all;
--
Entity wave_block23 is
port
( Clock : in std_logic;
  Reset : in std_logic;
  Data  : in std_logic_vector (8 downto 0);
  Data_In : out std_logic;
  Start : in std_logic;
  Level1_HP : out std_logic_vector (12 downto 0);
  Level2_HP : out std_logic_vector (16 downto 0);
  Level3_HP : out std_logic_vector (20 downto 0);
  Level3_LP : out std_logic_vector (20 downto 0);
  Output_Av1 : out std_logic;
  Output_Av2 : out std_logic;
  Output_Av3 : out std_logic
);
End wave_block23;

Architecture Structural of wave_block23 is
Component single_rate5
generic
( D_W         : integer := 9; -- input data width
```

30

```
            C_W              : integer := 9; -- coefficient widhth
            Wav_Type         : integer := 1; -- Daub 8 taps filter
            Taps             : integer := 8;
            Decim            : integer := 4);

port
         ( Data              : in std_logic_vector (D_W - 1 downto 0);
           Start             : in std_logic;
           Reset             : in std_logic;
           Clock             : in std_logic;
           Data_Read         : out std_logic;
           Lowpass_Out       : out std_logic_vector (D_W + C_W + (Taps/2) - 1 downto 0);
           Highpass_Out      : out std_logic_vector (D_W + C_W + (Taps/2) - 1 downto 0);
           Output_Av         : out std_logic -- latest output now available
         );

End Component;
         --
         signal Data_1 : std_logic_vector (8 downto 0);
         signal Data_2 : std_logic_vector (12 downto 0);
         signal Data_3 : std_logic_vector (16 downto 0);
         signal Start_1 : std_logic;
         signal Start_2 : std_logic;
         signal Start_3 : std_logic;
         signal Reset_1 : std_logic;
         signal Reset_2 : std_logic;
         signal Reset_3 : std_logic;
         signal Clock_1 : std_logic;
         signal Clock_2 : std_logic;
         signal Clock_3 : std_logic;
         signal Data_Read_1 : std_logic;
         signal Data_Read_2 : std_logic;
         signal Data_Read_3 : std_logic;
         signal Lowpass_Out_1 : std_logic_vector (20 downto 0);
         signal Lowpass_Out_2 : std_logic_vector (24 downto 0);
         signal Lowpass_Out_3 : std_logic_vector (28 downto 0);
         signal Highpass_Out_1 : std_logic_vector (20 downto 0);
         signal Highpass_Out_2 : std_logic_vector (24 downto 0);
         signal Highpass_Out_3 : std_logic_vector (28 downto 0);
         signal Output_Av_1 : std_logic;
         signal Output_Av_2 : std_logic;
         signal Output_Av_3 : std_logic;

-- Reference 1
         Begin
         U1 : single_rate5
         generic map (9, 8, 1, 8, 2)
         port map
```

```
                  ( Data => Data_1,
                    Start => Start_1,
                    Reset => Reset_1,
                    Clock => Clock_1,
 5                  Data_Read => Data_Read_1,
                    Lowpass_Out => Lowpass_Out_1,
                    Highpass_Out => Highpass_Out_1,
                    Output_Av => Output_Av_1
                  );
10
                  U2 : single_rate5
                  generic map (13, 8, 1, 8, 4)
                  port map
                  (Data => Data_2,
15                  Start => Start_2,
                    Reset => Reset_2,
                    Clock => Clock_2,
                    Data_Read => Data_Read_2,
                    Lowpass_Out => Lowpass_Out_2,
20                  Highpass_Out => Highpass_Out_2,
                    Output_Av => Output_Av_2
                  );

U3 : single_rate5
25                generic map (17, 8, 1, 8, 8)
                  port map
                  (Data => Data_3,
                    Start => Start_3,
                    Reset => Reset_3,
30                  Clock => Clock_3,
                    Data_Read => Data_Read_3,
                    Lowpass_Out => Lowpass_Out_3,
                    Highpass_Out => Highpass_Out_3,
                    Output_Av => Output_Av_3
35                );

-- Interconnections

Clock_1 <= Clock;
40                Clock_2 <= Clock;
                  Clock_3 <= Clock;

Reset_1 <= Reset;
                  Reset_2 <= Reset;
45                Reset_3 <= Reset;

Start_1 <= Start;
                  Start_2 <= Start;
```

32

```
    Start_3 <= Start;

Data_1 <= Data;

5   Data_2 <= Lowpass_Out_1(20 downto 8);
    Data_3 <= Lowpass_Out_2(24 downto 8);

Data_In <= Data_Read_1;

10  Level1_HP <= Highpass_Out_1(20 downto 8);
    Level2_HP <= Highpass_Out_2(24 downto 8);
    Level3_HP <= Highpass_Out_3(28 downto 8);
    Level3_LP <= Lowpass_Out_3(28 downto 8);

15  Output_Av1 <= Output_Av_1;
    Output_Av2 <= Output_Av_2;
    Output_Av3 <= Output_Av_3;

End;
20
```

33

Listing 2

```vhdl
-- ----------------------------------------------------------------
-- Name of vhdl code: single_rate5.vhd --  This one for orthonormal wavelets only 
--
-- Library components used: DSiP, IEEE
--
--
-- Author: Shahid Masud, Ph.D. Student, Q.U.B.
-- Date Started: Mar 04, 1999
-- ---------------------------------------------------------------- library IEEE;
use IEEE.std_logic_1164.all;
use IEEE.std_logic_arith.all;
--
LIBRARY DSiP;
USE DSiP.Basic.ALL;
USE DSiP.MultBase.ALL;
USE DSiP.DFFBase.ALL;
USE DSiP.AddBase.All;
--
LIBRARY WORK;
Use Work.Wavelet_Coeffs.all;
Use Work.Components.all;
--

Entity single_rate5 is generic
    ( D_W        : integer range 1 to 32 := 9;  -- input data width
      C_W        : integer range 1 to 32:= 9;   -- coefficient width
      Wav_Type   : integer := 1;  -- Daub 8 taps filter
      Taps       : integer range 1 to 32:= 8;
      Decim      : integer range 1 to 32:= 4);

port
    ( Data         : in std_logic_vector (D_W - 1 downto 0);
      Start        : in std_logic;
      Reset        : in std_logic;
      Clock        : in std_logic;
      Data_Read    : out std_logic;
      Lowpass_Out  : out std_logic_vector (D_W + C_W + (Taps/2) - 1 downto 0);
      Highpass_Out : out std_logic_vector (D_W + C_W + (Taps/2) - 1 downto 0);
      Output_Av    : out std_logic -- latest output now available
    );
```

34

```
        End single_rate5;
        --
        Architecture Structural of single_rate5 is
        --
        --complete pipelined two stage multiply+accumulation component
        component dc424_P2SMac
            generic (YWIDTH: integer range 2 to 1024 := 16;
                     XWIDTH: integer range 2 to 1024 := 16;
                     AEWIDTH: integer range 0 to 1024 := 0;
                     BSS: integer range 2 to 2048 := 6;
                     PIPE: integer range 0 to 2 := 1);
            port (M: out std_logic_vector(XWIDTH+YWIDTH+AEWIDTH-1 downto 0);
                  Y: in std_logic_vector(YWIDTH-1 downto 0);
                  X: in std_logic_vector(XWIDTH-1 downto 0);
                  A: in std_logic_vector(XWIDTH+YWIDTH+AEWIDTH-1 downto 0);
                  TC: in std_logic;-- '1': Tc, '0': unsigned binary
                  CLK: in std_logic);
            end component;
        --
        --
        --          Output registerable carry-look-ahead Tc adder
        --          flexible word length, aligned at right hand side
        --          A and B are sign-extended accordingly before addition
        --
            COMPONENT dc302_TcClaAdd
                GENERIC (ABits: INTEGER := 16;    -- <= SBits
                         BBits: INTEGER := 12;    -- <= SBits
                         SBits: INTEGER := 17;    -- <= 64, Bits or Bits+1,
                                 -- where Bits=max(ABits,BBits)
                         Pipe : INTEGER := 1);  -- 0,1
                PORT (S: OUT Std_Logic_Vector(SBits-1 DOWNTO 0);
                      A: IN Std_Logic_Vector(ABits-1 DOWNTO 0);
                      B: IN Std_Logic_Vector(BBits-1 DOWNTO 0);
                      Ck: IN Std_Logic);
            END COMPONENT;
        --
        --
        COMPONENT  dc111_AsyClrDFFs
            GENERIC (Bits: INTEGER := 16);
            PORT (Q   : OUT Std_Logic_Vector(Bits-1 DOWNTO 0);
                  D   : IN Std_Logic_Vector(Bits-1 DOWNTO 0);
                  Ce  : IN Std_Logic;-- clear enable, active HIGH
                  Cp  : IN Std_Logic); -- control pulse
```

35

```
     END COMPONENT; -- dc111_AsyClrDFFs;

--

5   type All_Coeffs is array (0 to Taps-1) of std_logic_vector (C_W -1 downto
     0);

--
     Function Assign_Coefficients_LP
10     (Wavelet_Type : integer;
        Filter_Taps : integer;
        Coefficient_Width : integer)
     Return All_Coeffs
     IS
15   variable array_var : All_Coeffs;

Begin for a in 1 to (Filter_Taps) loop
20     array_var(a-1) := Assign_Coeffs(Coefficient_Width, Wavelet_Type,0, a);
     end loop;

Return array_var;

25   End;
     --

Function Assign_Coefficients_HP
       (Wavelet_Type : integer;
30     Filter_Taps : integer;
        Coefficient_Width : integer)
     Return All_Coeffs
     IS 35   variable array_var : All_Coeffs;

Begin for a in 1 to (Filter_Taps) loop
40     array_var(a-1) := Assign_Coeffs(Coefficient_Width, Wavelet_Type,1, a);
     end loop;

Return array_var;

45   End;

--
```

36

```
        constant Coefficients_LP : All_Coeffs := Assign_Coefficients_LP(Wav_Type,
        Taps, C_W);
        constant Coefficients_HP : All_Coeffs := Assign_Coefficients_HP(Wav_Type,
        Taps, C_W);
 5 constant No_Of_Muls : integer range 0 to (Taps-1) := (Taps/Decim);
        -- amount of folding 10      --
        -- 2 delays are required at input for synchronization
        -- because first data is read and odd coefficients are
        -- processed. Then next data is read and even coefficients
        -- are processed. We want CoXo to appear at Xo.
15      -- signal Q_Delay1 : std_logic_vector (D_W -1 downto 0);
        signal Q_Delay2 : std_logic_vector (D_W -1 downto 0);
        signal D_Delay1 : std_logic_vector (D_W -1 downto 0);
20      signal D_Delay2 : std_logic_vector (D_W -1 downto 0);

--
        -- define array connecting the delay line
25      --      ---     ---     ---                     ---
        --   .--| D |-.-| D |-.-| D |-- - - - - - -.-| D |--.
        --   |   ---  |  ---  |  ---                |  ---  |
        --
        --
30      --

Type Delay_Array1 is array (0 to Taps-1) of std_logic_vector (D_W -1 downto
        0);
        Type Delay_Array2 is array (0 to Decim-1) of std_logic_vector (D_W-1 downto
35      0);

signal Delayed_LP : Delay_Array1;
        signal Delayed_HP : Delay_Array1;

40      --

-- define arrays for MAC connections
        --
        --              .--- X_Mul
45      --              |
        --            -----
        -- Y_Mul -> | Mul | <-- Clk
        --         |-----| <-- TC
```

37

```
        -- To_Add -> | Add |
        --            -----
        --             |___ P_Mul
        --
 5
        Type Mul_Input is array ( 0 to (Taps/Decim)-1) of std_logic_vector (D_W -1
        downto 0);

Type Mul_Coef  is array ( 0 to (Taps/Decim)-1) of std_logic_vector (C_W -1
10      downto 0);

Type Mul_Add   is array ( 0 to (Taps/Decim)-1) of std_logic_vector
        (D_W+C_W+(Taps/2)-1 downto 0);

15      Type Mul_Out   is array ( 0 to (Taps/Decim)-1) of std_logic_vector (D_W+C_W+
        (Taps/2)-1 downto 0);

signal X_Mac_LP : Mul_Input;
        signal Y_Mac_LP : Mul_Coef;
20      signal A_Mac_LP : Mul_Add;
        signal M_Mac_LP : Mul_Out;

signal X_Mac_HP : Mul_Input;
        signal Y_Mac_HP : Mul_Coef;
25      signal A_Mac_HP : Mul_Add;
        signal M_Mac_HP : Mul_Out;

constant Null_Sigl : std_logic_vector(D_W+C_W+(Taps/2)-1 downto 0) :=
30      (others =>'0');

-- ------- C O N T R O L     S I G N A L S -------

35      signal Reset_Local : std_logic := '0' ;
        signal Data_Advance : std_logic:= '0' ;
        signal TC_Mac : std_logic:= '0' ;
        signal Clk_Mac : std_logic:= '0' ;

40
        --                          /------- Ck_Add        /-- Available
        --                          .-----.-----.           .------------.
        --      A_Add     --->  | Add | DFF |----\--------> | Filter O/P |-->
        --                      '-----'-----'    |          '------------'
45      --                         ^          .------.
        --                         |          | DFF  | <--- Store_Result
        --                         |          '------' <--- Zero_Result
        --                      B_Add ---------/
```

38

```
    --
    --
    signal S_Add_LP : std_logic_vector (C_W+D_W+(Taps/2)-1 downto 0);
    signal A_Add_LP : std_logic_vector (C_W+D_W+(Taps/2)-1 downto 0);
    signal B_Add_LP : std_logic_vector (C_W+D_W+(Taps/2)-1 downto 0);
    signal D_Result_LP : std_logic_vector (C_W+D_W+(Taps/2)-1 downto 0);
    signal Q_Result_LP : std_logic_vector (C_W+D_W+(Taps/2)-1 downto 0);
    signal D_Output_LP : std_logic_vector (C_W+D_W+(Taps/2)-1 downto 0);
    signal Q_Output_LP : std_logic_vector (C_W+D_W+(Taps/2)-1 downto 0);

signal S_Add_HP : std_logic_vector (C_W+D_W+(Taps/2)-1 downto 0);
    signal A_Add_HP : std_logic_vector (C_W+D_W+(Taps/2)-1 downto 0);
    signal B_Add_HP : std_logic_vector (C_W+D_W+(Taps/2)-1 downto 0);
    signal D_Result_HP : std_logic_vector (C_W+D_W+(Taps/2)-1 downto 0);
    signal Q_Result_HP : std_logic_vector (C_W+D_W+(Taps/2)-1 downto 0);
    signal D_Output_HP : std_logic_vector (C_W+D_W+(Taps/2)-1 downto 0);
    signal Q_Output_HP : std_logic_vector (C_W+D_W+(Taps/2)-1 downto 0);

signal Ck_Add : std_logic:= '0' ;
    signal Store_Result : std_logic:= '0' ;
    signal Zero_Result : std_logic:= '0' ;
    signal Available : std_logic:= '0' ;

signal Counter : integer range 0 to Decim := 0;

-- ------------------------------------------------------------------
    -- New Procedure to Allocate Coefficients, Based on External Signals
    -- ------------------------------------------------------------------

-- ------------------------------------------------------------------
    -- PROCEDURE TO CONNECT X INPUT OF MULTIPLIERS TO RESPECTIVE TAPS
    -- ------------------------------------------------------------------
    --Procedure Mul_Inputs
    --( signal signal1 : out Mul_Input;
    --  signal signal2 : in Delay_Array1;
    --  Taps : in integer;
    --  Decimation : in integer;
    --  Counter : in integer range 0 to Taps)
    --IS --Begin --For a in 0 to ((Taps/Decimation)-1) loop   -- no of muls
    -- For Counter in 0 to (Decimation-1) loop
    --  If Counter < (Decimation/2) then -- case odd
    --    signal1(a) <= signal2( (Decimation*a) + (2*Counter) );
```

39

```
--    else
--      signal1(a) <= signal2( (Decimation*a) + (2*(Counter-(Decimation/2)) )
      );
--    end if;
--  end loop;
--end loop;

--End;

-- ------------------------------------------------------------------
--
-- ------------------------------------------------------------------
-- PROCEDURE TO CONNECT ADDER INPUT OF MACS TO PREVIOUS MAC OUTPUT
-- ------------------------------------------------------------------
Procedure Mac_Add_Inputs
( signal signal1 : in Mul_Out;
  signal signal2 : out Mul_Add;
  Taps : in integer;
  Decim : in integer )

IS constant null_input : std_logic_vector (D_W+C_W+(Taps/2)-1 downto 0) :=
(others => '0');

Begin signal2(0) <= null_input;

for i in 0 to (Taps/Decim) -1 loop

If i = 0 then
    signal2(0) <= null_input;
  else
    signal2(i) <= signal1(i-1);
  end if;

end loop;

End;

-- ------------------------------------------------------------------
-- ------------------------------------------------------------------

-- Reference 3
Begin -- architecture
```

```
step1_LP: for i in 0 to (Taps-3) generate
  delay_blocks_LP : dc111_AsyClrDFFs
    generic map (D_W)
    port map
    (Q  => Delayed_LP(i+1),
     D  => Delayed_LP(i),
     Ce => Reset_local,        -- clear enable, active HIGH
     Cp => Data_Advance
    );                         -- control pulse
END generate; -- dc111_AsyClrDFFs;

-- step2_LP: for i in 0 to (No_Of_Muls-1) generate
  MAC_Units_LP: dc424_P2SMac
    generic map(C_W, D_W, Taps/2, 6, 0)
    port map
        (M => M_Mac_LP(i),
         Y => Y_Mac_LP(i),
         X => X_Mac_LP(i),
         A => A_Mac_LP(i),
         TC => TC_Mac,
         CLK=> Clk_Mac);
  END generate; -- dc424_P2SMac --
-- Reference 2 step1_HP: for i in 0 to (Taps-3) generate
  delay_blocks_HP : dc111_AsyClrDFFs
    generic map (D_W)
    port map
    (Q  => Delayed_HP(i+1),
     D  => Delayed_HP(i),
     Ce => Reset_local,   -- clear enable, active HIGH
     Cp => Data_Advance
    );                    -- control pulse
END generate; -- dc111_AsyClrDFFs;

-- step2_HP: for i in 0 to (No_Of_Muls-1) generate
  MAC_Units_HP: dc424_P2SMac
    generic map(C_W, D_W, Taps/2, 6, 0)
    port map
        (M => M_Mac_HP(i),
         Y => Y_Mac_HP(i),
         X => X_Mac_HP(i),
```

```
                A => A_Mac_HP(i),
                    TC => TC_Mac,
                    CLK=> Clk_Mac);
                END generate; -- dc424_P2SMac
 5
                --

Accumulator_LP: dc302_TcClaAdd
                GENERIC map
10              (D_W+C_W+(Taps/2), D_W+C_W+(Taps/2), D_W+C_W+(Taps/2), 1)
                PORT map
                (S  => S_Add_LP,
                 A  => A_Add_LP,
                 B  => B_Add_LP,
15               Ck => Ck_Add);

--

Adder_Result_LP : dc111_AsyClrDFFs
20                  GENERIC map (C_W+D_W+(Taps/2))
                    PORT map
                    (Q    => Q_Result_LP,
                     D    => D_Result_LP,
                     Ce   => Zero_Result,
25                   Cp   => Store_Result);    -- control pulse

--

Output_Latch_LP : dc111_AsyClrDFFs
30               Generic map (C_W+D_W+(Taps/2))
                 Port map
                 ( Q   => Q_Output_LP,
                   D   => D_Output_LP,
                   Ce  => Reset_Local,
35               Cp  => Available
                 );

-- for hp now
40              Accumulator_HP: dc302_TcClaAdd
                GENERIC map
                  (D_W+C_W+(Taps/2), D_W+C_W+(Taps/2), D_W+C_W+(Taps/2), 1)
                PORT map
                  (S => S_Add_HP,
45               A => A_Add_HP,
                 B => B_Add_HP,
                 Ck => Ck_Add);
```

```
        --

Adder_Result_HP : dc111_AsyClrDFFs
            GENERIC map (C_W+D_W+(Taps/2))
 5          PORT map
            (Q    => Q_Result_HP,
             D    => D_Result_HP,
             Ce   => Zero_Result,
             Cp   => Store_Result);        -- control pulse
10
        --

Output_Latch_HP : dc111_AsyClrDFFs
         Generic map (C_W+D_W+(Taps/2))
15       Port map
          ( Q   => Q_Output_HP,
            D   => D_Output_HP,
            Ce  => Reset_Local,
            Cp  => Available
20        );

-- Input Delays
        --2 delay DFF are required at the input to synchronize the data
        --read in and the control. Share same delay between LP and HP.
25
        Delay1 : dc111_AsyClrDFFs
            GENERIC map (D_W)
            PORT map
            (Q    => Q_Delay1,
30           D    => D_Delay1,
             Ce   => Reset_Local,
             Cp   => Data_Advance);

35      Delay2: dc111_AsyClrDFFs
            GENERIC map (D_W)
            PORT map
            (Q    => Q_Delay2,
             D    => D_Delay2,
40           Ce   => Reset_Local,
             Cp   => Data_Advance);

--

45      -- input connections

D_Delay1 <= Data;
        D_Delay2 <= Q_Delay1;
```

```
                Delayed_LP(0) <= Q_Delay2;
                Delayed_HP(0) <= Q_Delay2;

--
                Clk_Mac <= '0';
                --
                --Accumulator connections A_Add_LP <= M_Mac_LP((Taps/Decim)-1);
                A_Add_HP <= M_Mac_HP((Taps/Decim)-1);

B_Add_LP <= Q_Result_LP;
                B_Add_HP <= Q_Result_HP;

D_Result_LP <= S_Add_LP;
                D_Result_HP <= S_Add_HP;

D_Output_LP <= S_Add_LP;
                D_Output_HP <= S_Add_HP;

Lowpass_Out <= Q_Output_LP; -- goes to output port

Highpass_Out <= Q_Output_HP; -- goes to output port

--

Data_Read <= Data_Advance;

--

Mac_Add_Inputs (M_Mac_LP, A_Mac_LP, Taps, Decim);
                Mac_Add_Inputs (M_Mac_HP, A_Mac_HP, Taps, Decim);

--

TC_Mac <= '1'; -- for 2's complement numbers

--

Output_Av <= Available;

Reset_Local <= Reset;

-- interconnections
                -- ----------------------------------------------------------------
```

44

```
         -- The following control signals need to be generated
         -- ------ Ck_Add
         -- ------ Available
         -- ------ Counter
   5     -- ------ Data_Advance
         -- ------ Zero_Result
         -- ------ Store_Result
         -- ------ Clk_Mac
         -- ------------------------------------------------------------
  10
         -- Reference 4
         Control_Block : Process variable a : integer range 0 to Decim;
  15     variable b : integer range 0 to 3;
         constant Max_Count : integer := 3 * Decim; -- 3, 6, 12, 24
         variable Current : integer range 0 to Max_Count := 0;
         variable Cur : integer range 0 to Max_Count := 0;

20     Begin wait until (Clock'event and Clock='1');

If (Reset = '1') then
  25       b := 0;
           a := Decim-1;
           Current := 0;
           Cur := 0;
           Counter <= a;
  30       Zero_Result <= '1';
           Store_Result <= '0';
           Data_Advance <= '0';
           Ck_Add <= '0';
           Available <= '0';
  35
          elsif (Reset= '0' and Start='1')

then 40     case b is

When 0 =>

If ((2*(Decim+a+1) rem Decim = 0)) then
  45        Data_Advance <= '1';
           end if;
           If a = (Decim-1) then
            Zero_Result <= '1';
```

45

```
         Available <= '1';
       else -- (a /= Decim-1)
         Store_Result <= '1';
       end if;
 5
     Ck_Add <= '0';

When 1 =>

10   Data_Advance <= '0';
     Zero_Result <= '0';
     Ck_Add <= '0';
     Store_Result <= '0';
     Available <= '0';
15
     a := a+1;
       If a >= Decim then
         a:= 0;
       end if;
20
     Counter <= a;

When 2 =>

25   Data_Advance <= '0';
     Zero_Result <= '0';
     Available <= '0';
     Ck_Add <= '1';
     Store_Result <= '0';
30

When others => null;

End case;
35
   b := b+1;

If b > 2 then
     b:= 0;
40 end if;

-- look here for timing loop

Current := Current + 1;
45 If Current >= Max_Count then
     Current := 0;
   end if;
```

```
        end if;

End Process;
  5
        --

Coefficient_Allocation : Process (Counter)

10     Begin

If (Counter < (Decim/2)) then -- case odd

For u in 0 to ((Taps/Decim)-1) loop
 15           Y_Mac_LP(u) <= Coefficients_LP(1 + (Counter*2) + (Decim*u));
              Y_Mac_HP(u) <= Coefficients_HP(1 + (Counter*2) + (Decim*u));
            end loop;

else
 20
            For v in 0 to ((Taps/Decim)-1) loop
              Y_Mac_LP(v) <= Coefficients_LP(0 + ((Counter-(Decim/2))*2) + (Decim*v));
              Y_Mac_HP(v) <= Coefficients_HP(0 + ((Counter-(Decim/2))*2) + (Decim*v));
            end loop;
 25 end if;

End Process;
 30
        --

Connect_Mac_Input : Process (Counter)

35     Begin

-- first odd then even

If (Counter < (Decim/2)) then -- case odd
 40
            For u in 0 to ((Taps/Decim)-1) loop
              X_Mac_LP(u) <= Delayed_LP( (Decim*u) + (2*Counter) );
              X_Mac_HP(u) <= Delayed_HP( (Decim*u) + (2*Counter) );
            end loop;
 45
         else For v in 0 to ((Taps/Decim)-1) loop
```

46

47

```
      X_Mac_LP(v) <= Delayed_LP((Decim*v) + (2*(Counter-(Decim/2))));
      X_Mac_HP(v) <= Delayed_HP((Decim*v) + (2*(Counter-(Decim/2))));
   end loop;
end if;

End Process;

End; -- end architecture
```

What is claimed is:

1. An architecture component for use in performing a wavelet transform of a sampled signal, the component including at least one multiplier, and a respective multiplexor to multiplex a number n of filter coefficients onto the respective multiplier, in which the or each multiplier processes n consecutive samples with consecutive coefficients, the or each multiplier and respective multiplexor implementing a number m of processing stages for each sample, the architecture component further including an accumulator for summing the or each multiplier output for each processing stage; and a buffering stage for storing summed multiplier outputs, an output comprising summed multiplier outputs being generated after every n samples, and wherein a delay line is provided between processing stages, the delay line causing sample data to be conveyed from each processing stage to a subsequent processing stage with a delay of n times a sampling period of the signal.

2. An architecture according to claim 1 in which the wavelet transform is a discrete wavelet transforms.

3. An architecture according to claim 1 in which the wavelet transform is a wavelet packet decomposition.

4. An architecture component according to claim 1 which comprises a plurality of multipliers and associated multiplexors.

5. An architecture component according to claim 1 in which n=2.

6. An architecture component according to claim 1 in which each of said processing stages is implemented by a respective multiplier and respective multiplexor.

7. An architecture component according to claim 1 including a chain of n buffers through which data is conveyed from each stage to a subsequent stage.

8. An architecture component according to claim 1 including a summing stage operative to sum the values stored in the buffering stage to produce an output for every n sample received.

9. An architecture component according to claim 1 comprising a further multiplexor operative to present each sample to a multiplier a plurality of times for multiplication by a plurality of coefficients.

10. An architecture component according to claim 1 in which the multiplier is embodied within a MAC unit.

11. An architecture for performing a discrete wavelet transform of a sampled signal comprising a plurality of series-connected architecture components according to claim 1.

12. A core for incorporation into an integrated circuit for implementing a wavelet transform, the core having an architecture component according to claim 1.

* * * * *